United States Patent [19]

Carvalho

[11] Patent Number: 5,431,539
[45] Date of Patent: Jul. 11, 1995

[54] PROPELLER PITCH CHANGE MECHANISM

[75] Inventor: Paul A. Carvalho, Westfield, Mass.

[73] Assignee: United Technologies Corporation, Hartford, Conn.

[21] Appl. No.: 147,236

[22] Filed: Oct. 28, 1993

[51] Int. Cl.[6] ............................................. B64C 11/32
[52] U.S. Cl. ........................... 416/168 R; 416/157 R; 416/165
[58] Field of Search ............... 416/157 R, 165, 168 R, 416/168 A, 164

[56] References Cited

U.S. PATENT DOCUMENTS

| | | | |
|---|---|---|---|
| 2,792,897 | 5/1957 | Dagrell | 416/165 |
| 3,628,922 | 12/1971 | Sprenger | 416/168 R |
| 3,920,353 | 11/1975 | Bredsted | 416/168 A X |
| 4,718,823 | 1/1988 | Dennison | 416/168 R |
| 4,750,862 | 6/1988 | Barnes et al. | 416/165 |
| 5,116,209 | 5/1992 | Anglade et al. | 416/164 |

FOREIGN PATENT DOCUMENTS 541043  1/1977  U.S.S.R. ............................... 416/157

*Primary Examiner*—Edward K. Look
*Assistant Examiner*—Michael S. Lee
*Attorney, Agent, or Firm*—Norman Friedland

[57] ABSTRACT

The pitch change mechanism for a variable pitch propeller blade or Advanced Ducted Propulsor (ADP) interconnecting the pitch change actuator and the propeller blades of the type that includes a trunnion attached to the root of the propeller blade, the connecting mechanism includes in one embodiment a translating ball screw nut interconnecting the trunnion through a yoke and a cooperating sliding pin and arm connector. In another embodiment where a hydraulic piston is included in the pitch change actuator the cylindrical housing supports a plurality of circumferentially spaced pins that are in sliding relationship with a rod attached to the trunnion. The trunnions in both embodiments are extended to make the interconnections. Means are provided to prevent the blades from binding up during pitch change movements. This invention eliminates the heretofore utilized sliding anti-rotation spline and the multiple linkage connectors.

13 Claims, 7 Drawing Sheets

PROPELLER PITCH CHANGE MECHANISM

TECHNICAL FIELD

This invention relates to variable pitch propellers and particularly to the mechanism for changing the pitch of the blades and the construction thereof.

BACKGROUND ART

This invention constitutes an improvement over the propeller pitch change mechanism disclosed in U.S. Pat. No. 5,199,850 granted to E. H. Kusiak and myself on Apr. 6, 1993 entitled "Pitch Stop Assembly for Variable Pitch Propulsor" which is commonly assigned to United Technologies Corporation. In that patent the pitch change is effectuated by a ballscrew and ballscrew nut assembly that is responsive to a mechanical differential gearing that imparts rotary motion to the ballscrew that, in turn, translates the ballscrew nut. The ballscrew nut is attached to the root of the propeller blade through a yoke, trunnion and a connecting link for increasing and decreasing the pitch of the blade. Each blade includes the trunnion and connecting link and are moved in unison so that the blade angles are uniformly changed.

Of necessity, the pitch change mechanism disclosed in the U.S. Pat. No. 5,199,850, supra, includes an antitorque tube assembly that permits axial motion while preventing rotational movement of the ballscrew nut. The heretofore utilized anti-torque tube or sliding antirotation spline which comprise mating splines formed in a cooperating pair of concentrically mounted cylinders supported around the engine's center line serves to ensure that the ballscrew nut will not rotate as a result of the momentum of the ballscrew and by the force generated by the centrifugal twisting moment of the blades. As one skilled in this art will appreciate the anti-rotation spline assembly is not only heavy but is an expensive part of the pitch change assembly.

I have found that I can eliminate the individual connecting links and the anti-rotation spline assembly by virtue of this invention. This invention contemplates extending the trunnion attached to the root of each blade that cooperates with an arm and pin assembly that is operatively connected to the ballscrew nut. By virtue of this invention, pitch change movement is effectuated in such a manner that the blades will not bind up and the ballscrew nut is allowed to slightly rotate. To this end, the arm end, in one embodiment, is made to translate rectilinearly relative to the pin and in an alternative embodiment the pin translates relative to the trunnion end. In another embodiment, a translating cylinder operatively connected to the blades for pitch change movement is designed so that the cylinder is allowed to slightly rotate in a manner that eliminates the need of the sliding anti-rotation spline. In another embodiment that utilizes the translating ballscrew nut, the dimension of the yoke arms are judiciously selected to allow minimal bending in the plane that will assure that the blades do not bind up upon pitch change movement.

This invention is particularly efficacious in the advanced ducted fan (ADP) concept of a gas turbine engine. The ADP is a new propulsor design that affords extremely high bypass ratios for attaining fuel economy and thrust reversing so as to eliminate the heavy and complex engine thrust reversing mechanism. As one skilled in this art will appreciate, the weight, envelope size and economy of the variable pitch fan or propeller is extremely important and the specification is typically mandated by the engine manufacturer so that the propeller designer and manufacturer is confined to these specifications. This, of course, places a heavy burden on the propeller designer. Thus, a gas turbine engine with an ADP affords all the advantages that are available in the propeller technology, including, but not limited thereto, the flow optimization for all aircraft operating modes, feathering in the event of a malfunction, low pitch stop, pitch lock and reversing. As mentioned above, these features are attainable and desirable only if the propeller fall within the constraints of the specification established for a particular engine.

In the context of this patent application the terms "propeller", "ADP" and "propulsor" are used interchangeably inasmuch as the concept of this invention is applicable to propulsors that may be in the propeller class or ADP class.

SUMMARY OF THE INVENTION

An object of this invention is to provide an improved pitch change mechanism for a variable pitch propeller.

A feature of this invention is the provision of an extended trunnion operatively connected to the pitch change cylinder including a pin and rod end assembly that is moveable relative to each other.

A still further feature of this invention is improved pitch change mechanism that in another embodiment includes a ball screw and ballscrew nut assembly operatively connected to the root of the blade for pitch change movement and including an extended trunnion including an arm and pin assembly that moves relative to each other and a judiciously dimensioned arm that is flexible in a circumferential direction to assure that the blades do not bind up during pitch change movements.

A still further object of this invention is to provide a pitch change actuation mechanism that is characterized as being relatively less complex, lighter, and less expensive than heretofore known pitch change actuation mechanisms that eliminates the necessity of a sliding anti-rotational spline and the individual connecting links interconnecting the yoke and the trunnion of the blades.

The foregoing and other features of the present invention will become more apparent from the following description and accompanying drawings.

BEST MODE FOR CARRYING OUT THE INVENTION

For the sake of simplicity and convenience only that part of the pitch change mechanism of a propeller or ADP will be described in the description of the preferred embodiment and for further details of pitch change mechanism reference should be made to U.S. Pat. No. 5,199,850, supra, incorporated herein by reference. Suffice it to say that the pitch change mechanism serves to vary the pitch of the blade to provide the optimum air flow characteristics for a given flight or ground operating condition including reversing while assuring that fuel consumption is maintained at its minimum and that the requisite safety features are provided. As this invention only deals with simplifying certain aspects of the pitch change mechanism, the other features of the pitch change mechanism is omitted from this description.

Figure 1:
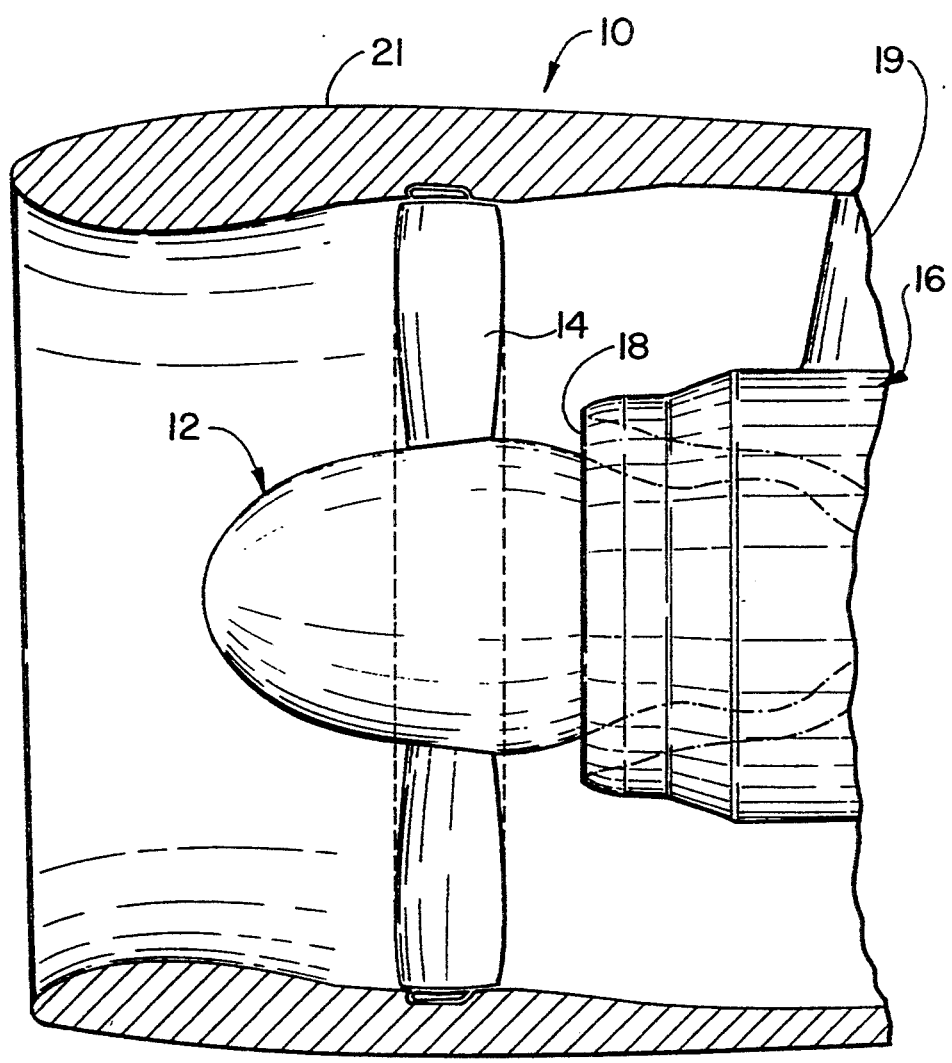
FIG. 1 is a partial view partly in elevation and partly in section of a variable pitch propulsor of the advanced ducted fan attached to a gas turbine engine.

As shown in FIG. 1, the invention is disclosed as being utilized on an ADP generally indicated by reference numeral 10. ADP 10 which is a variable pitch fan 12 comprising a plurality of circumferentially spaced variable pitch fan blades 14 suitably connected to and powered by the gas turbine engine generally illustrated by reference numeral 16. The gas turbine engine may take the form of any known commercially available engines of the type exemplified by the PW2000, PW4000 and the JT9D family of twin spool, axial flow engines manufactured by the Pratt & Whitney division of United Technologies Corporation, the assignee of this patent application which is of the type described in U.S. Pat. No. 4,069,662 granted to Redinger, et al on Jan. 24, 1978 and entitled "Clearance Control for Gas Turbine Engines" and incorporated herein by reference. The fan is housed in the fan duct 21 supported to the engine casing by struts 19, where a portion of the air discharging from the fan blades bypasses the engine 16 and the remaining portion is admitted into the engine through the inlet 18.

The fan 12 may by interconnected by a gear box (not shown) in any suitable manner to obtain the desired fan speed. It is typical that the fan rotational speed is less than the rotational speed of the engine and the gear box reduces the speed of the fan. In order to effectuate pitch change movement in response to the pitch change actuator the root of each of the blades are eccentrically connected to the ball screw nut of the ball screw by a yoke that carries an equal number of links to obtain uniform pitch change movement. This linkage is fully described in U.S. Pat. No. 5,199,850, supra. By virtue of this invention and as can be seen by referring to FIG. 2, these links are eliminated. As noted, the typical ball screw 22 that is coaxially mounted about the engine center line identified by reference letter A is threadably connected to the ball screw nut 24. Pitch change movement is effectuated by rotating the ball screw 22 by the pitch change actuator (not shown) which, in turn, translates the ball screw nut rectilinearly to move the blades to the high and low pitch positions, at times referred to as the course and fine pitch positions. The pitch change actuator may take any one of several different forms, as for example, the differential gearing arrangement disclosed in the U.S. Pat. No. 5,199,850, supra, or the actuation mechanism disclosed in U.S. Pat. No. 5,205,712 granted to P. U. Hamilton on Apr. 27, 1993 and entitled "Variable Pitch Fan Gas Turbine Engine". Suffice it to say that this invention is only concerned with the mechanism that interconnects the pitch change actuator and the blades and for further details of the operation of the pitch change actuating mechanism reference should be made to the various references already incorporated herein.

Affixed to and supported to ball screw nut 24 is the yoke 26 which is an annular member that is co-axially supported about centerline A and translate with the ball screw nut 24. Axially extending from and formed integrally with the yoke 26 are a plurality of arms 28 that interconnect to the trunnion 30 of each of the blades 14. There being an arm 28 for each of the blades. The end of arm 28 is formed with a central aperture 39 that has fitted therein a spherical ball that includes a central aperture 40. Pin 36 is supported to clevis 38 attached to the end of the trunnion 30 and fits into aperture 34 so as to be in sliding relationship with pin 36. Each blade 14 is suitably attached to the hub or disk 32 for pitch change movement about the blades longitudinal axis generally indicated by reference letter B.

As is apparent from the foregoing, translation of ball screw nut 24 by virtue of the ball screw 22 being rotated in response to the pitch change actuator, will effectively cause the blades to rotate about longitudinal axis B via the yoke 26, end of arm 28 and the pin 36 attached to the trunnion of the blade. Since the radii extending from the ball screw nut to the point of contact between the end of arm 28 and pin 36 will remain constant for each axial position of the ball screw nut 24, the kinematics of the system must account for the varying distances between the connecting points for each axial position of the ball screw nut 24. This invention solves this problem by virtue of the arm and pin connection by allowing both members to translate relative to each other. In the present embodiment, the end of arm 28 moves parallel to the longitudinal axis B.

Figure 3:
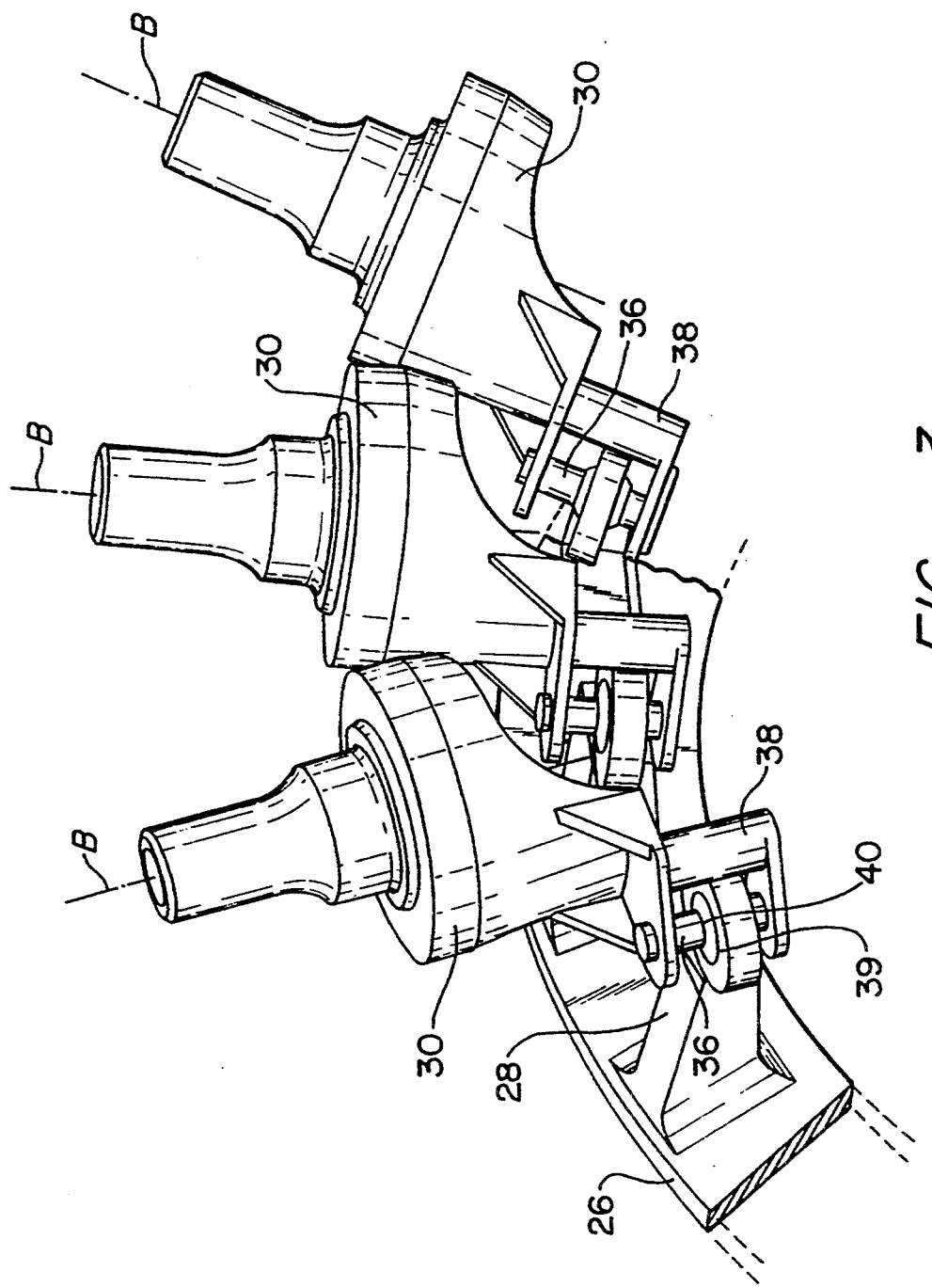
FIG. 3 is a partial view in perspective illustrating the connection of the trunnion and yoke of the pitch change mechanism.

This kinematic relationship can best be seen by referring to FIG. 3 which is a perspective view showing the arm end 28 connecting the pin 36. (Like reference numerals designate like parts throughout all the Figures). As noted the arm end 28 is mounted relative to the pin 36 to slide up and down the pin 36. Translation of yoke 26 in either direction will cause arm 28 to rotate the trunnion 30 about the pitch change axis B placing the end of arm 28 to be in a new axial position relative to pin 36.

It is well known that in unison type of connectors as described above between the yoke, arms, pins and trunnions of each blade, due to manufacturing tolerances, unison rotation of the blades about the pitch change axis, at times, causes the blades to bind up. This invention solves this problem by judiciously dimensioning the arms to have a less rigid portion that allows the arm to have a given amount of flexibility to slightly bend during the pitch change rotation in order to prevent the blades from binding. The particular thickness of the arm will be predicated on the particular loads encountered for a given application.

Figure 4:
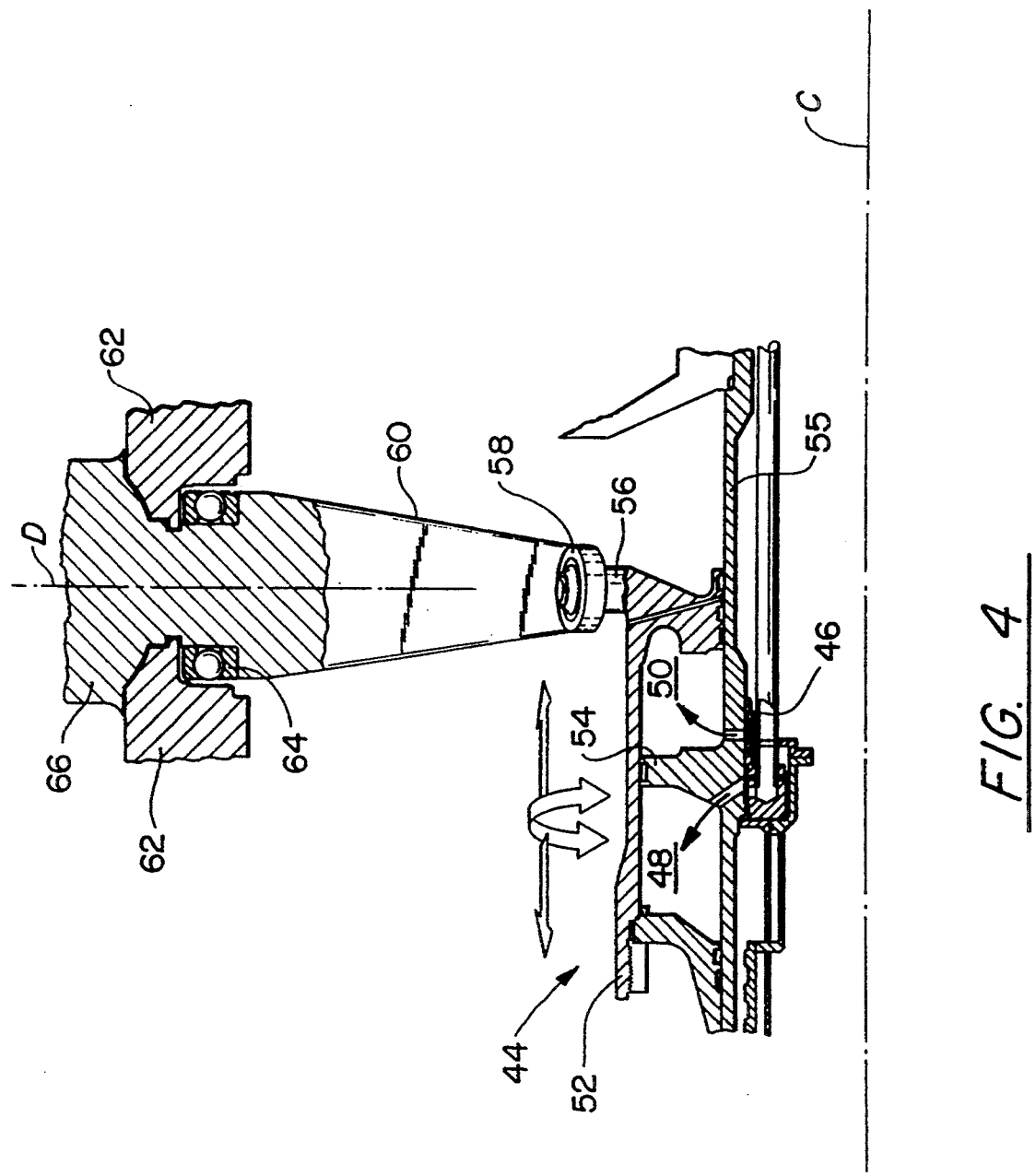
FIG. 4 is a partial view in section of another embodiment of the pitch change mechanism of this invention.

FIG. 4 exemplifies an embodiment of this invention where the pitch change actuator includes an hydraulic actuator. In this embodiment the hydraulic actuator generally indicated by reference numeral 44 is fluidly connected to the pilot valve 46 that is translated by the pitch change control mechanism (not shown) to port hydraulic fluid into either cavity 48 or 50 and bleed fluid from the cavity that is not connected to the high pressure source. Cavities 48 and 50 are defined by the cylindrical housing 52 and the fixed piston 54 and the axially extending annular member 55 that are coaxially mounted around the engine's center line C. As is apparent from this FIG. 4, high pressure fluid applied to either one of the cavities will cause the cylinder housing 52 to translate rectilinearly. The outer diameter of cylinder housing 52 at one end carries a plurality of circumferentially spaced upstanding pins 56 that mate with the rod end 58 attached to or formed integral with the trunnion 60. Trunnion 60 is attached in a well known manner to the blades 66 that are supported to the hub 62 by the ball bearings 64 for pitch change movement about the longitudinal axis indicated by reference letter D.

Figure 5:
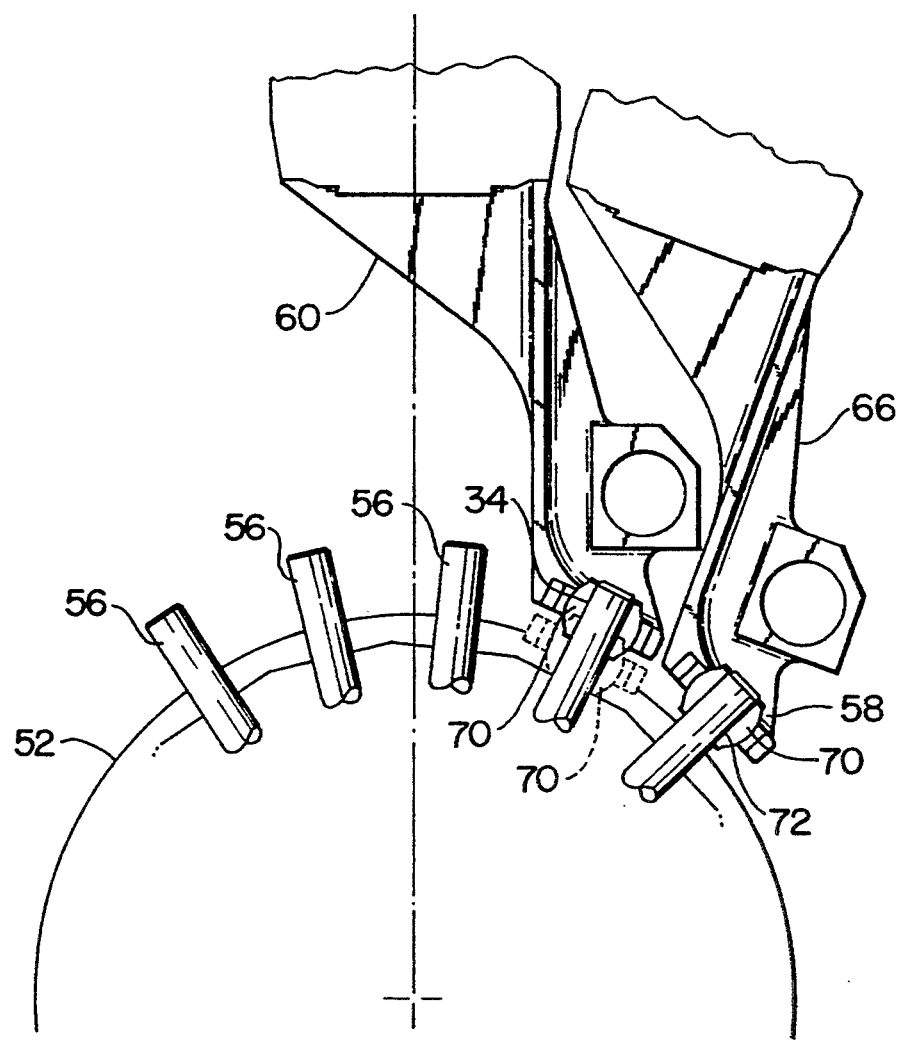
FIG. 5 is a partial view in elevation showing the interconnection of the trunnion and yoke of the pitch change mechanism of FIG. 4.

Referring next to FIG. 5 which is an elevated view showing the interconnection between the pins 56 of cylinder and the rod ends 58 attached to the trunnions 60. As noted rod ends 58 include a spherical member 70 affixed to the rod end 58 that is slidably connected through the central aperture 72 to the pin 56. Inasmuch as each connection for each blade are identical for the sake of simplicity and convenience only one connection will be described hereinbelow. As the cylinder translates carrying the pin 56 which is eccentrically mounted relative to blade 66 trunnion 60 will be rotated to rotate blade 66 about the pitch change axis D, similar to the pitch change movement associated with FIGS. 2 and 3. This movement will cause the pin 56 to translate vertically up and down rod end 58. It will be noted that the pin translates axially in this embodiment in contrast to the embodiment depicted in FIGS. 2 and 3 where the pin remains stationary and the arm moves relative thereto.

In the embodiment utilizing the hydraulic actuator of FIGS. 4 and 5, the cylinder housing 52 is free to rotate about the annular axially extending member 55. Hence, articulation of the trunnion 60 about the blade axis D will effectuate a dual movement, 1) the rod end 58 will translate rectilinearly and 2) the cylinder housing 52 will slightly rotate. This embodiment, similar to the embodiment of FIGS. 2 and 3, will also eliminate the heretofore utilized connecting links and the sliding anti-rotation spline.

In a ADP application the actuator loads are the lowest at the midstroke position, which is the feather position, thus the cantilever load on the pins in the embodiment shown in FIG. 5 are minimized.

Of course, it will be understood that the entire pitch change assembly in all the embodiments are supported to the engine's shaft through the gear box and are rotated thereby. The movement described in connection with the pitch change movement is movement that is relative to the propellers or fan's rotational speed.

Figure 2:
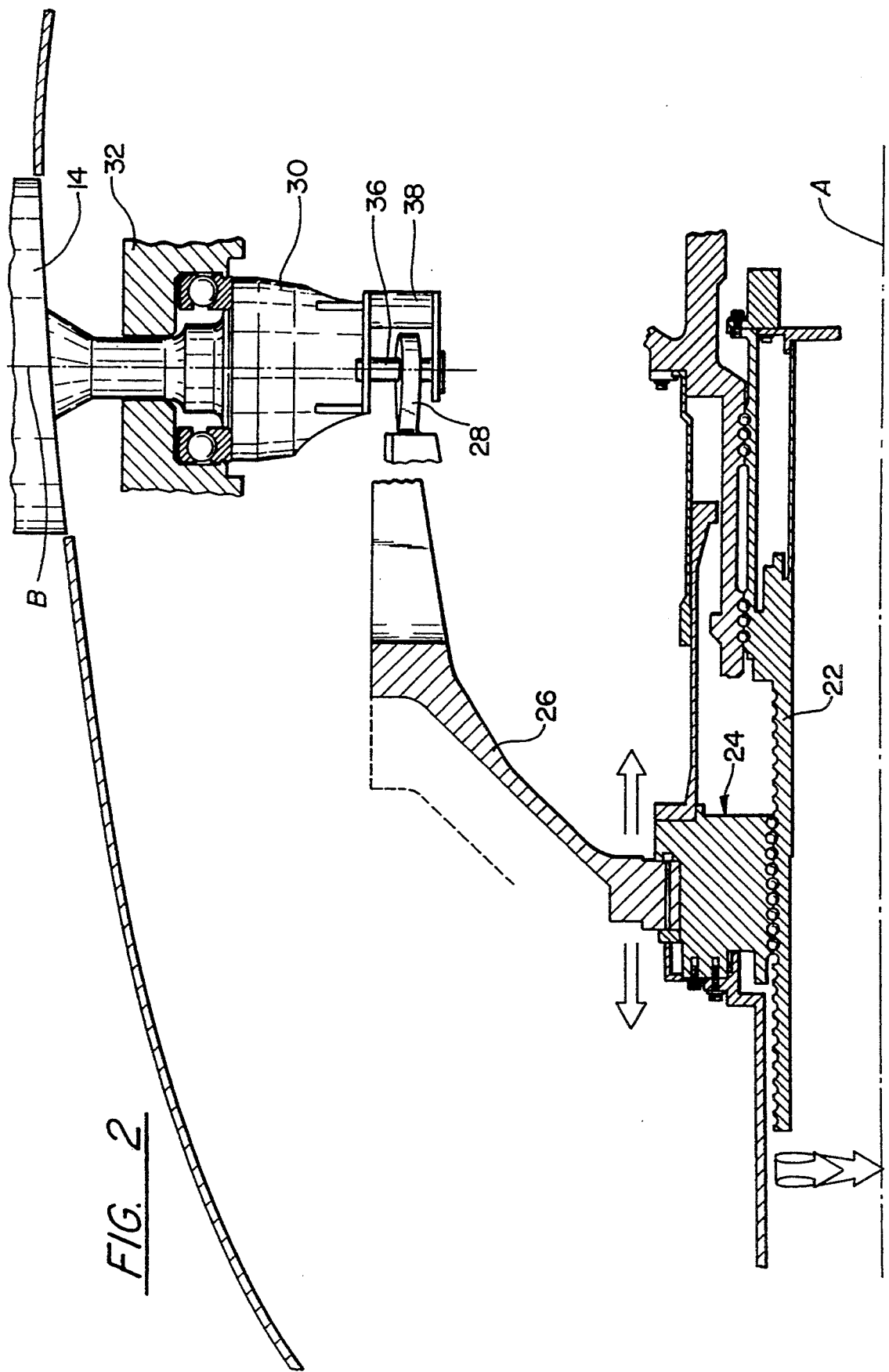
FIG. 2 is a partial view in section showing the pitch change mechanism of this invention.

As will be apparent to one skilled in this art, the arm end 28 and pin 36 arrangement exemplified in FIG. 2 can be adapted to be actuated by the hydraulic system exemplified in FIG. 4 and the rod and pin arrangement exemplified in FIG. 4 can be adapted to be actuated by the ball screw actuator exemplified in FIG. 2. The embodiments depicted in FIGS. 6 and 7 illustrate how each connection can be adapted to the ball screw or hydraulic actuator which will be described immediately hereinbelow.

Figure 6:
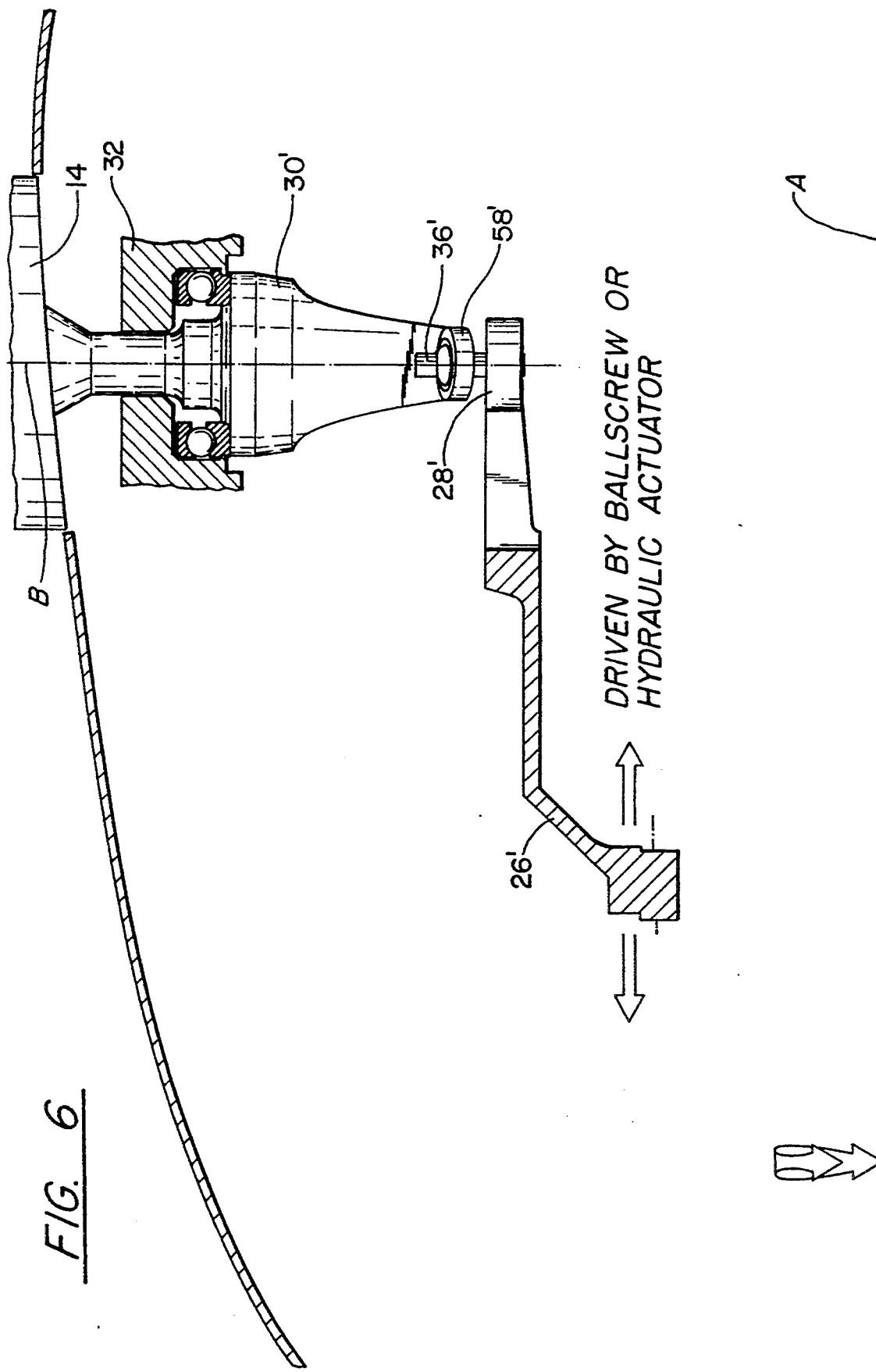
FIG. 6 is a partial view in section illustrating the yoke, rod end and pin arrangement of this invention which can be adapted for pitch change movement utilizing either a ball screw or hydraulic actuator.
Figure 7:
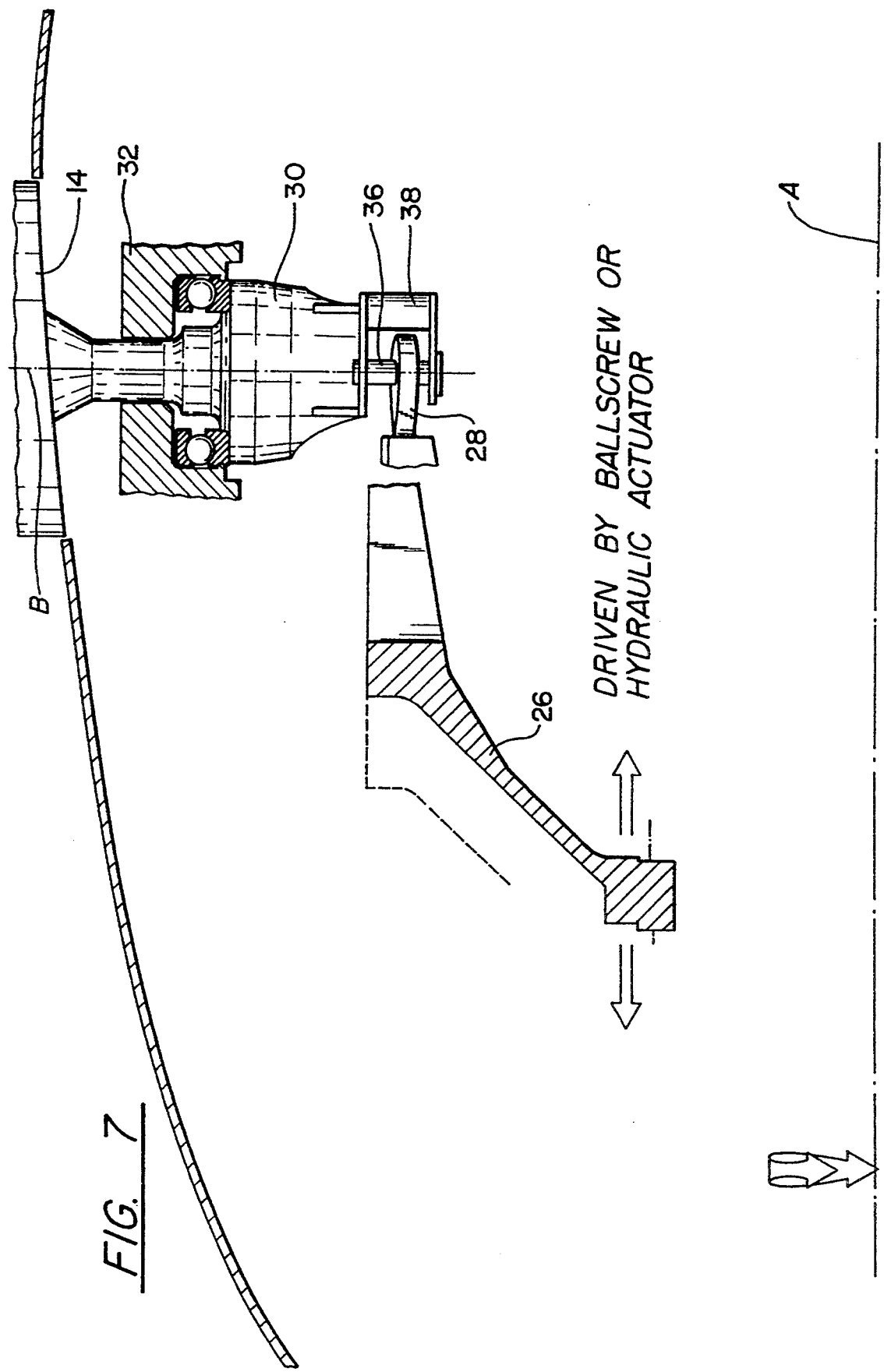
FIG. 7 is a partial view in section illustrating the yoke, arm end and pin arrangement of this invention which can be adapted for pitch change movement utilizing either a ball screw or hydraulic actuator.

Referring next to FIGS. 6 and 7 which demonstrate the pitch change connection between the actuator which may be a ball screw or hydraulic. In FIG. 7 the connection includes the yoke 26, arm end 28 and pin 36 connected to clevis 38 which in turn is connected to trunnion 30. In FIG. 6 the connection includes yoke 26', arm end 28', pin 36' and rod end 58'. As noted the trunnion 30' and yoke 26' are modified so that the components mate. In each instance, the pin 36' and rod end 58' and the pin 36 and arm end 28 are slidably connected so that there is relative motion between the mating parts.

Although this invention has been shown and described with respect to detailed embodiments thereof, it will be appreciated and understood by those skilled in the art that various changes in form and detail thereof may be made without departing from the spirit and scope of the claimed invention.

I claim:

1. A propulsor having a plurality of variable pitch blades including actuator means for varying the pitch of said blades about its longitudinal axis, said blades including a hub for supporting said blade for rotational movement about the axis of the propulsor and the longitudinal axes of said blades, each blade having a root end, a trunnion extending from said root end, connection means interconnecting said actuator means and said trunnion of each blade including a pin, said connection means for rotating said blades about said longitudinal axis, said connection means disposed in linear sliding relationship with said trunnion for transmitting rectilinear motion relative to said trunnion, whereby said connection means and said pin rotate each of said blades in unison about said longitudinal axis for obtaining pitch change movement.

2. A propulsor as claimed in claim 1 wherein said connection means includes an annular yoke disposed coaxially relative to said axis of said propulsor, arms circumferentially spaced in said yoke and extending axially toward said trunnion and there being an arm for each trunnion and slidably connected to said pin whereby said arm moves axially relative to said pin upon pitch change movement.

3. A propulsor as claimed in claim 2 including a spherical bearing in an aperture formed in said arm and a central opening in said spherical bearing operatively connected to said pin.

4. A propulsor as claimed in claim 3 including a clevis attached to said trunnion and supporting said pin in radial alignment relative to said axis of said propulsor.

5. A propulsor as claimed in claim 4 wherein said actuator means includes a ball screw that is rotatable in clockwise and counter clockwise directions, and a ball screw nut operatively connected to said ball screw for rectilinear movement, said yoke attached to said ball screw nut to be positioned rectilinearly with said ball screw nut for effectuating pitch change movement.

6. A propulsor as claimed in claim 1 wherein said actuator means includes a movable hollow cylinder and a fixed piston mounted in said hollow cylinder, said hollow cylinder closed at either end and defining with said fixed piston a pair of opposing fluid receiving chambers, fluid connection means for selectively admitting and bleeding fluid from said fluid receiving chambers for moving said cylinder rectilinearly, a plurality of circumferentially spaced pins attached to said cylinder, said connection means operatively connected to said pins in sliding relationship for rotating said blades in unison about said longitudinal axis for pitch change movement, whereby said pins move axially relative to said connection means when said blades are changing pitch.

7. A propulsor as claimed in claim 6 wherein said cylinder is rotated circumferentially around said axis of the propulsor when said blades are changing pitch.

8. A propulsor as claimed in claim 7 wherein said connection means includes a rod end attached to each of said trunnions, said rod end operatively connected to said pins and being in sliding relationship relative thereto whereby said pin moves axially relative to said rod end when said blades changes pitch.

9. A propulsor as claimed in claim 8 including a spherical bearing mounted in an aperture formed in said rod, and said pin fitting into a central opening formed in said spherical bearing.

10. A propulsor as claimed in claim 4 wherein said actuator means includes a hydraulic actuator including a moveable cylinder closed on either end defining a chamber, a fixed piston disposed in said chamber defining a pair of opposing sub-chambers, means for admitting fluid into and bleeding fluid from said sub-chambers for moving said cylinder rectilinearly, said yoke attached to said cylinder to be positioned rectilinearly with said cylinder for effectuating pitch change movement.

11. A propulsor as claimed in claim 1 wherein said actuator means includes a movable hollow cylinder and a fixed piston mounted in said hollow cylinder, said hollow cylinder closed at either end and defining with said fixed piston a pair of opposing fluid receiving chambers, fluid connection means for selectively admitting and bleeding fluid from said fluid receiving chambers for moving said cylinder rectilinearly, a yoke operatively connected to said cylinder, a plurality of circumferentially spaced pins attached to said yoke, said connection means operatively connected to said pins in sliding relationship for rotating said blades in unison about said longitudinal axis for pitch change movement, whereby said pins and said connection means move axially relative to each other when said blades are changing pitch.

12. A propulsor as claimed in claim 11 wherein said connection means includes a rod end attached to each of said trunnions, said rod end operatively connected to said pins and being in sliding relationship relative thereto whereby said pin and said rod end moves axially relative to each other when said blades changes pitch.

13. A propulsor as claimed in claim 12 including a spherical bearing mounted in an aperture formed in said rod, and said pin fitting into a central opening formed in said spherical bearing.

* * * * *